United States Patent Office 3,549,478
Patented Dec. 22, 1970

3,549,478

GLASS LAMINATE HAVING A BROMINATED RESIN INTERLAYER

Frank H. Gillery, Allison Park, Jacob A. Dvorak, Natrona Heights, Ronald R. Rabenold, Allison Park, and John R. Peffer, Pittsburgh, Pa., assignors to PPG Industries, Inc., Pittsburgh, Pa., a corporation of Pennsylvania No Drawing. Filed Apr. 2, 1968, Ser. No. 718,189
Int. Cl. B32b 17/10, 31/24
U.S. Cl. 161—185 24 Claims

ABSTRACT OF THE DISCLOSURE

A cured transparent bromine-containing resin selected from the group consisting of bromine-containing unsaturated polyester resins and bromine-containing epoxy resins is used as a laminating resin to bind two or more glass layers. The resulting glass laminate has outstanding X-ray absorbing properties, physical properties, and optical properties. The laminates are useful as cathode ray tubes, safety glass windshields, and the like.

The adhesion of glass plates to various substrates has long been a problem. This is particularly so when it is desired to adhere a glass plate to another transparent plate, such as glass, therefore, generally requiring the laminating resin to possess good optical properties as well as physical properties.

One of the important applications of laminating resins is in the manufacture of cathode ray tubes, particularly television picture tubes. To protect against television picture tube implosion, a glass implosion plate is attached to the viewing surface of the cathode ray tube. This is accomplished by using as a laminating resin between the tube and implosion plate a transparent resin which upon curing, secures the implosion plate to the face of the cathode ray tube. This laminating resin must be transparent, have good glass adhesion, relatively low temperature flexibility, negligible shrinkage, and be economical in cost and application.

Until recently, the laminates currently being used were sufficient to provide a safe system without restricting the view of the screen. With the advent of color television, however, a new safety problem is presented. The conventional black and white television sets required only about 15 kilovolts to operate and at that level the amount of X-radiation emitting from the face of the tube is negligible. The color television sets, however, require from about 25 to 35 kilovolts to operate and at that voltage level X-radiation through the face plate can become a serious health hazard.

Due to the rising concern over the X-radiation emission from color TV sets, the medical profession has been attempting to set maximum permissible X-ray exposure levels to reduce the risk of radiation damage to television viewers. For instance, the National Committee on Radiation Health in 1959 has set the maximum permissible level of television X-ray exposure at 0.5 milliroentgen per hour (mr. per hour) at a distance of 5 centimeters from the tube. This level has been adopted as a standard by Underwriters Laboratories. Tests have shown that at a current of 1.0 milliampere and an anode voltage range of 25 to 35 kilovolts, the X-radiation, emitting through a conventional picture tube face was from 0.07 to 8.5 milliroentgens per hour at a distance of 5 centimeters. As X-ray exposure is cumulative, the danger of X-ray emission from color television sets has now become a serious problem.

It has now been found that a resin comprising a transparent bromine-containing resin selected from the group consisting of transparent, bromine-containing unsaturated polyesters and transparent bromine-containing epoxy resins when used as a laminating resin of practical thickness for a color television set operating at a voltage level of about 25 to about 35 kilovolts effectively reduces X-radiation emitting from the face plate of the television set to less than 0.5 milliroentgen per hour at a distance of 5 centimeters and still retains the adhesive and optical properties required for use as a laminate for a television set.

These new laminating resins not only protect against implosion of the cathode ray tube, but reduce the level of X-radiation emitting from the tube to an acceptable amount and retain the strength and optical properties of the tube.

The essentially clear laminating resins which have been found to provide the above advantages include bromine-containing unsaturated polyester resin compositions and bromine-containing epoxy resin compositions.

The unsaturated polyester resins which are treated so as to incorporate bromine in the instant invention are conventional polyester resins comprising the esterification product of a polycarboxylic acid and a polyol. In most cases, from about 5 mol percent to about 75 mol percent of the polycarboxylic acid component is an alpha, beta-ethylenically unsaturated polycarboxylic acid. Such polyesters are ordinarily cured by copolymerization with a $CH_2{=}C<$ monomer polymerizable with the unsaturated acid. Although levels of an unsaturated polycarboxylic acid in excess of 75 mol percent are not generally used, higher levels can be used when the polyester is prepared from a flexibilizing polyol, such as polypropylene glycol and the like. The term "acid" as used in this specification and appended claims includes the corresponding anhydrides where such anhydrides exist.

The polyesters generally utilized in preparing the polyester resins useful in this invention have an acid number of about 5 to about 45 although an acid number of about 10 to about 35 is preferred. The $CH_2{=}C<$ monomer is generally present in quantities of about 15 percent by weight to about 80 percent by weight of the polyester resin, although preferably the quantity of $CH_2{=}C<$ monomer present in the resin is about 20 percent by weight to about 40 percent by weight.

These polyesters may be prepared by the esterification of a mixture of polycarboxylic acids, wherein an alpha, beta-ethylenically unsaturated polycarboxylic acid comprises about 5 mol percent to about 75 mol percent of the acid mixture, with a suitable polyol. This esterification may be conducted in the presence of a suitable non-reactive solvent, for example, toluene, xylene and the like, which is later removed; or the esterification reaction may be conducted in the absence of any solvent wherein the reactants are vigorously purged with an inert gas which removes the water of condensation as well as excluding oxygen from the reaction vessel.

The esterification reaction is generally conducted at about 350° F. to about 450° F. The reaction is continued until the desired acid number is reached, which for purposes of this invention is generally an acid number of about 5 to about 45.

The proportion of reactants employed in preparing the unsaturated polyesters of this invention is not critical and the ratio of the reactants may be varied according to the conventional procedures for producing polyesters. Theoretically, one equivalent of polyol is utilized for each equivalent of acid. However, it is conventional practice to utilize from 5 percent to about 20 percent by weight excess polyol.

The above reaction occurs without the aid of a catalyst although a catalyst such as p-toluene sulfonic acid, tannic acid, pyrogallol, or the like, may be added if desired. However, the esterification reaction of an unsaturated acid is conventionally conducted in the presence of a suitable inhibitor which prevents gelation during reaction. If such an inhibitor is not present during the esterification reaction, then an inhibitor is added before the unsaturated polyester is thinned with a $CH_2{=}C{<}$ monomer, such as styrene, vinyl toluene, and the like. Suitable inhibitors include: quinone, hydroquinone, phenyl hydrazine hydrochloride, catechol, p-t-butyl catechol, p-benzyl aminophenol, di-beta-naphthyl paraphenyldiamine, trimethyl benzyl ammonium acid oxalate, and the like.

The polycarboxylic acid mixture, as mentioned above, generally contains about 5 mol percent to about 75 mol percent of an alpha, beta-ethylenically unsaturated polycarboxylic acid in the production of polyesters useful in this invention. Such alpha, beta-ethylenically unsaturated polycarboxylic acids include: maleic acid, fumaric acid, glutaconic acid, citraconic acid, itaconic acid, mesaconic acid, and the like, and of course, the respective anhydrides where such anhydrides exist.

The remainder of the polycarboxylic acid mixture can comprise a saturated polycarboxylic acid or an aromatic unsaturated polycarboxylic acid, or a mixture of these. The aromatic unsaturated acids do not substantially participate in cross-linking reactions with $CH_2{=}C{<}$ monomers or with alpha, beta-ethylenically unsaturated polycarboxylic acids. Such aromatic unsaturated acids include: phthalic acid, isophthalic acid, terephthalic acid, endomethylene tetrahydrophthalic acid, hexachloroendomethylene tetrahydrophthalic acid, tetrabromophthalic acid, and the like, including of course, the corresponding anhydrides where such anhydrides exist.

Saturated acids which may be used include: hexahydrophthalic acid, adipic acid, succinic acid, pimelic acid, suberic acid, azelaic acid, sebacic acid, malonic acid, and the like.

Polyols useful in preparing the polyesters used in this invention include: ethylene glycol, propylene glycol, butylene glycol, glycerol, diethylene glycol, dipropylene glycol, triethylene glycol, pentaerythritol, neopentyl glycol, bis(4-hydroxycyclohexyl)-2,2-propane, trimethylol propane, and the like.

Unsaturated polyols may also be utilized in the preparation of the above-described polyesters. Such unsaturated polyols are generally used in minor quantities and include butenediol, 2,5-dimethyl-3-hexyne-2,5-diol, and the like.

The unsaturated polyesters prepared in the manner described above have a medium to high molecular weight and are generally thinned with a $CH_2{=}C{<}$ monomer to achieve a suitable viscosity. The $CH_2{=}C{<}$ monomer also serves as a cross-linking agent which facilitates curing of the unsaturated polyester resin. The conventional cross-linking monomers include: styrene, vinyl toluene, alpha-methyl styrene, divinyl benzene, chlorostyrene, diallyl phthalate, triallyl cyanurate, methyl methacrylate, allyl carbonate, methallyl maleate, and the like.

In applications where a low temperature-curing unsaturated polyester is required, then the preferred cross-linking monomers are styrene and methyl methacrylate, or mixtures thereof.

As mentioned above, the $CH_2{=}C{<}$ monomer is utilized in quantities of about 15 percent by weight to about 80 percent by weight of the weight of the polyester resin. Also, when the polyester is thinned with a $CH_2{=}C{<}$ monomer, an inhibitor, such as the ones listed above, should be present to preclude gelation during storage of the resin.

The preferred transparent polyester resin is one which also contains a silane selected from the class consisting of 3-glycidyloxypropyltrimethoxysilane, 3-(trimethoxysilyl) propyl methacrylate, and 3,4-epoxycyclohexylethyltrimethoxysilane. These polyesters are described in U.S. Pat. 3,334,008.

A more comprehensive description of polyester preparation, raw materials, catalysts, inhibitors, and the like, can be found in Polyesters and Their Applications by Johan Bjorksten, Reinhold Publishing Co. (1956), pages 21 to 97, and in Polyester Resins by John R. Lawrence, Reinhold Publishing Co. (1960), pages 13 to 106.

Any transparent bromine-containing epoxy compound or mixture wherein the epoxy has a 1,2-epoxy equivalency of greater than 1.0, that is, in which the average number of 1,2-epoxy groups per molecule is greater than 1 may be used in this invention.

The average number of epoxy groups may be a fractional number and in general is less than 4.0. These polyepoxides comprise a relatively large class of materials and have been described in numerous patents. Some of these patents are U.S. Pats. Nos. 2,467,171, 2,615,007, 2,716,-123, 3,030,336, 3,053,855 and 3,075,999.

Among the polyepoxides which can be used herein are the polyglycidyl ethers of polyphenols, such as bisphenol A. These may be attained, for example, by etherification of a polyphenol with epichlorohydrin or dichlorohydrin in the presence of an alkali. The phenolic compound may be bis(4-hydroxy-phenyl)2,2 - propane, 4,4' - dihydroxybenzophenone, bis(4-hydroxy-phenyl)1,1-ethane, bis(4-hydroxy-phenyl)1,1-isobutane, bis(4-hydroxy-phenyl)2,2-propane, bis(4-hydroxy-tertiary butyl phenyl)2,2-propane, bis(2-hydroxy-naphthyl)-methane, 1,5 - dihydroxy - naphthalene, or the like. The polyphenol can also be a novolak resin or a similar polyphenol resin.

Such polyglycidyl ethers of polyphenols correspond to the average formula:

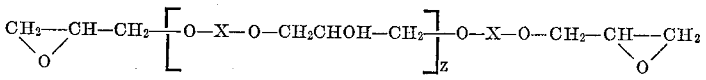

in which X represent an aromatic radical and $z$ represents a whole or fractional small number.

Examples of this class of polyepoxides are the reaction products of bisphenol A and epichlorohydrin, which correspond to the structure:

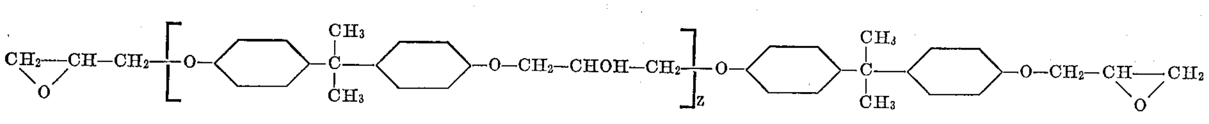

in which $z$ represents a whole or fractional small number.

Also suitable are the similar polygylcidyl ethers of polyhydric alcohols which may be derived from such polyhydric alcohols as ethylene glycol, diethylene glycol, triethylene glycol, 1,2-propylene glycol, 1,4-butylene glycol, 1,5-pentanediol, 2,4,6-hexanetriol, glycerol, trimethylolpropane, and the like.

Other examples of polyepoxides that may be used in this invention are the partial fatty acid esters of the above-mentioned glycidyl polyethers of polyhydric alcohols and glycidyl polyethers of polyhydric phenols. Linseed oil and castor oil are examples of fatty acids that may be used to produce these resins.

Also suitable are polygylcidyl esters of polycarboxylic acids which are produced by the reaction of epichlorohydrin or a similar epoxy compound with an aliphatic or aromatic polycarboxylic acid, such as oxalic acid, succinic acid, glutaric acid, adipic acid, azelaic acid, phthalic acid, isophthalic acid, terephthalic acid, 2,5-naphthalenedicarboxylic acid, dimerized linolenic acid, and the like. Examples are diglycidyl adipate and diglycidyl phthalate, and similar esters which correspond to the formula:

$$\underset{\diagdown O \diagup}{CH_2—CH}—CH_2—(OOC—X—COO—CH_2—CHOH—CH_2)_z—OOC—X—COO—CH_2—\underset{\diagdown O \diagup}{CH—CH_2}$$

in which $x$ represents a hydrocarbon radical, such as a phenyl or other aromatic radical or an aliphatic radical, and $z$ represents a whole or fractional small number.

Other examples are polyepoxides derived from the epoxidation of olefinically unsaturated aliphatic compounds. Included are diepoxides and higher epoxides, as well as mixtures of epoxides comprising in part one or more monoepoxides. These polyepoxides are non-phenolic and are obtained by epoxidation of olefins such as butadiene and cyclohexene, for example, by oxygen and selected metal catalysts, by perbenzoic acid, by acetaldehyde monoperacetate, or by peracetic acid.

Among the polyepoxides derived from the epoxidation of alicyclic compounds are those of the formula:

$$Z—(CH_2)_n—O—\overset{O}{\overset{\|}{C}}—Z$$

wherein $n$ is a small whole number, e.g., from 1 to 8, and $z$ is a radical of the structure:

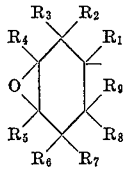

where $R_1$ through $R_9$ are hydrogen or lower alkyl radicals, i.e., having up to about 8 carbon atoms. Examples of these polyepoxides are described in United States Pat. No. 2,716,123.

There may also be employed the corresponding diesters of the formula:

$$Z—(CH_2)_n—O—\overset{O}{\overset{\|}{C}}—(CH_2)_n—\overset{O}{\overset{\|}{C}}—O—(CH_2)_n—Z$$

where $n$ and Z are as above. Products of this type may be produced, for example, by reducing the cyclic unsaturated aldehyde from the Diels-Alder reaction of crotonaldehyde and butadiene (or similar reactants) to the corresponding alcohol and reacting 2 moles of this alcohol with 1 mole of sebacic acid or a similar dicarboxylic acid.

Other polyepoxides from the epoxidation of olefinically unsaturated alicyclic compounds are those of the formula:

$$Z—(CH_2)_n—O—\overset{O}{\overset{\|}{C}}—(CH_2)_n(C_mH_{2m-1}O)$$

where Z and $n$ are as above and the group $(C_mH_{2m-1}O)$ is an epoxyalkyl group, preferably having from 8 to 16 carbon atoms. These compounds may be produced by the epoxidation of a 3-cyclohexenylalkyl ester of a monounsaturated fatty acid, for example, with peracetic acid. Examples of these compounds are disclosed in U.S. Pat. No. 2,786,066.

Higher epoxides are produced from the similar reaction of 3-cyclohexenylalkyl esters of polyunsaturated fatty acids, and these can also be employed in the invention. These include, for example, the polyepoxides of U.S. Pat. No. 2,786,067 and others having the formula:

$$Z—(CH_2)_n—O—\overset{O}{\overset{\|}{C}}—(CH_2)_n—(C_mH_{2m-3}O_2)$$

where Z and $n$ are as above and $(C_mH_{2m-3}O_2)$ is a diepoxyalkyl radical.

Other polyepoxides from the epoxidation of olefinically unsaturated alicyclic compounds are the epoxyalicyclic ethers which correspond to the above-described epoxyalicyclic esters. For example, these have the formula:

$$Z—(CH_2)_n—O—(CH_2)_n—Z$$

where Z and $n$ are as above. They may be obtained by the epoxidation of dicyclopentadiene.

Still other examples of epoxy resins usable in this invention are epoxidized oils such as epoxidized soybean oil, cycloaliphatic diepoxides and epoxidized novolak resins obtained by epoxidizing the condensation products of an aldehyde with a polyhydric phenol.

The preferred epoxies are the epoxies produced from the reaction of tetrabromo bisphenols and epihalohydrins.

The bromine may be incorporated into the unsaturated polyesters and epoxies using any available methods. One convenient method is by adding a soluble bromine-containing compound to the resin. This may be accomplished by either adding the bromine-containing compound as a reactant when preparing the unsaturated polyester or epoxy or by adding a soluble bromine-containing compound to the already formed unsaturated polyester or epoxy.

The most common method of incorporating bromine into an unsaturated polyester is by using tetrabromophthalic acid or anhydride as part of the acid component of the polyester. The amount of bromine in the resulting polyester is determined by the proportions of tetrabromophthalic acid used in the acid component. The bromine content in the laminate can also be controlled by reacting tetrabromophthalic acid in a polyester and adding a non-brominated polyester to dilute the laminating resin to the desired bromine content.

A common method of incorporating bromine into an epoxy resin is by cooking in the bromine. This may be accomplished by reacting a brominated bisphenol such as tetrabromobisphenol with an epihalohydrin to form the bromine-containing epoxy resin. The bromine content here may also be varied by adding other epoxy compounds to the brominated epoxy compound.

Already formed unsaturated polyesters may have bromine incorporated therein by adding brominated plasticizers such as the dimethyl ester of tetrabromophthalic acid or tris(2,3-dibromopropyl) phosphate to the polyester. It is only necessary that the bromine-containing compound added to the unsaturated polyester or epoxy resin be soluble in the resin and that the resin remains transparent after being cured.

The amount of bromine in the transparent laminating resin is not ordinarily critical. It has been found that the amount of X-radiation emitting from the glass laminated with the bromine-containing resin decreases with increasing concentration of bromine in the resin. Hence, the amount of bromine in the resin is determined by balancing the cost of having higher concentrations of bromine against the need for increased protection against X-ray emission. In the preferred embodiments of this invention, the laminating resin contains from 3 to 40 percent by weight of bromine.

The transparent bromine-containing polyester or transparent bromine-containing epoxy is used as a laminating resin for a glass sheet (preferably a cathode ray tube) and a transparent protective member (usually a glass plate). Any glass plate composition can be used including leaded glass plates as transparent protective members, that is, glass plates which contain from 1 to 10 percent by weight of lead. Because of the high expense involved in manufacturing leaded glass and in utilizing leaded glass, it is preferable to use glass having a low lead content. Using the resin interlayers of this invention, it is possible to do so and maintain the X-radiation emission at a safe level.

As noted above, it is desirable to use glass without a large amount of lead incorporated therein for economic reasons. However, for some purposes wherein X-radiation emission is extremely heavy and it is desirable to reduce the X-ray emission to extremely low values, the use of the resins of this invention containing bromine in conjunction with the use of leaded glass is desirable. Particularly good results are obtained using resins containing from about 3 percent bromine to about 10 percent bromine as the laminating resin and glass containing about 6 percent lead as the transparent overlayer.

The resinous interlayer may be any thickness. Generally the interlayer is from 0.02 inch to 0.50 inch. It is preferred to use as thin a layer as is necessary to absorb the required amount of X-radiation emission and maintain proper adhesion between the glass layers.

In general, the laminating of the implosion plate or cap to the cathode ray tube with the composition of the present invention can be effected by any of the several methods known to those skilled in the art of cathode ray tube manufacturing. The bromine-containing polyester resin is first catalyzed and an accelerator for the catalyst is generally added. Suitable polymerization catalysts for polyester resins are generally added in quantities of about 0.05 percent to about 4 percent by weight of the total polyester resin and include: benzoyl peroxide, methyl ethyl ketone peroxide, cumene hydroperoxide, lauroyl peroxide, tertiary butyl hydroperoxide, p-chlorobenzoyl peroxide, succinic acid peroxide, hydroxyheptyl peroxide, di-t-butyl diperphthalate, and the like.

Suitable accelerators for such catalysts are generally added in quantities of about 0.01 percent to about 0.5 percent by weight of the total polyester resin and include: cobalt naphthenate, manganese naphthenate, diethyl aniline, dimethyl aniline, doceyl mercaptan, mercapto ethanol, triethanolamine, diethylenetriamine, butyraldehyde aniline, piperidine, and the like.

The bromine-containing epoxy resins ordinarily require the addition of chemical hardening agents before they can be laminated and cured. Some examples of hardening agents that may be used with the brominated epoxy resins here are: organic acid anhydrides, such as maleic, pyromellitic, phthalic or hexahydrophthalic anhydride; amines such as diethylamine or diethylene triamine; and other agents including, boron trifluoride, diisocyanates, urea-formaldehyde resins, dicyandiamide, glyoxal, aromatic polysulfonic acids, etc. Because the reaction between the epoxy resin and the hardening agent may proceed rather slowly, small amounts of activators are sometimes included in the reactive composition, for example, alkali phenoxides, Friedel-Crafts type catalysts, and various amines, particularly tertiary amines.

The chemical hardening agents are generally used in amounts equivalent to the free epoxy groups in the epoxy resin. Where the resin contains hydroxyl groups which enter into the reaction, curing may be effected with somewhat lesser amounts, although usually with some decrease in the strength of the resulting cured resinous product.

Although any method of laminating the implosion plate to the cathode ray tube with the brominated epoxy may be used, one convenient method involves mounting the cap and tube after thorough cleaning in a jig assembly which positions the cap at a predetermined distance from the face of the tube. The tube and cap are then passed through a heated chamber to give the desired glass temperature, i.e., about 80° C. As the parts emerge from the heating chamber, the cap is lowered from the tube (or the tube raised from the cap) about ½ inch to permit rapid dispensing of the resin into the cap. Thereafter, the glass parts are brought together until the resin is displaced and is forced to fill the gap whereupon the jig attembly is secured. Curing of the resin is generally effected at elevated temperatures from about 60 to about 100° C.

The bromine-containing unsaturated polyester resins which have been thinned and properly catalyzed are generally applied in the same manner as the bromine-containing epoxy resins may be applied. The preparation of a glass laminate, particularly a safety glass laminate can also be carired out simply by pouring the uncured polyester resin between two spaced glass plates. Spacers are usually employed around the perimeter to insure uniform thickness of the interlayer. In order to obtain optimum results, the catalyzed polyester resin and glass assembly is subjected to a temperature ranging from about 60° F. to about 450° F. for a period of one-half hour to about 24 hours, the time required for curing being inversely proportional to the curing temperature although slight over-curing is not generally detrimental or objectionable.

If the glass-resin laminate comprises one surface of an evacuated glass tube, such as a television picture tube, then it is preferable to maintain the curing temperature below about 160° F. and preferably between about 60° F. and about 140° F. for a period of about one-half hour to about 24 hours wherein the curing period varies substantially inversely with the curing temperature. The preferred resins for such low temperature curing are those unsaturated polyesters of the type described above which are thinned with styrene, methyl methacrylate or mixtures thereof. At temperatures of about 140° F. or below, it is generally preferred that the thinning monomer be styrene, or mixtures of styrene and methyl methacrylate wherein styrene is the predominant monomer.

Various mechanical devices may be employed in admitting the resinous material into the empty space, or spaces, between plural pieces of glass. One particular advantageous method is to seal the periphery of two substantially parallel sheets of glass with a pressure-sensitive tape and force the resinous material with the aid of pressure into the space between the sheets of glass. The resinous material is conveniently forced through a self-closing valve which is held in place with the tape while the trapped air is discharged through an aperture in the taped seam at the top of the cell. The tape may or may not be left on during and after *cu*ring.

Another method of admitting the resin into the cell comprises heating the resin, preferably to about 150° F., which substantially reduces the viscosity of the resin, and pouring the resin into the cell in a manner so as not to entrap air. The laminate may then be cured by permitting the cell to stand at room temperature for about 2 hours to about 24 hours, or by heating up to a temperature of about 450° F. in a manner similar to laminates formed by the method described above wherein the resin is not pretreated.

Although the preferred use of the transparent bromine-containing polyester resins and the transparent bromine-containing epoxy resins are in the cathode ray tube-implosion safety glass laminate, other types of laminate can be prepared using these compositions, for example, other safety glass laminates which can be prepared include automotive safety glass windshields, and the like, and saftey glass windows for aircraft.

The following examples illustrate in detail the preparation and use of the laminate described hereinabove. The examples are not intended to limit the invention for there are, of course, numerous possible variations and modifications.

The X-ray absorption of the bromine-containing films and of the films and glass was determined by the formula:

$$I=I_0e^{-\mu_1t_1-\mu_2t_2}$$

where:

I=X-radiation intensity after passing through the resin film and glass plate in milliroentgens.

$I_0$=X-radiation intensity before passing through the safety panel in milliroentgens.

$e$=base of natural logarithms.

$t_1$=thickness of the resin in centimeters.

$t_2$=thickness of the glass in centimeters.

$\mu_1$=linear coefficient of X-ray absorption in centimeters$^{-1}$ characteristic of the resin, dependent on incident beam energy (anode voltage) and spectral distribution.

$\mu_2$=linear coefficient of X-ray absorption in centimeters$^{-1}$ characteristic of the glass, dependent on incident beam energy (anode voltage) and spectral distribution.

The efficiency of X-ray absorption is determined by the ratio of $I/I_0$ which is called the fractional transmission. This is the fraction of the original X-radiation intensity that is allowed to pass through the film or film and protective glass plate.

The source of X-rays for the measurements in the examples was chosen to be as close as possible to emission from a TV tube. An iron target tube in a Norelco diffraction unit was used to simulate the iron shield which is believed to be the emitting source within the color tube. Before reaching the sample, the X-ray beam was passed through a section of Corning 9019 TV faceplate (0.248 inch thick glass). The character of the final X-ray beam is, therefore, similar in character to that issuing from the tube face. The counter used was a standard Norelco halogen quenched tube. The kilovoltage figures recorded were those measured by a Sylvania Type 301 Polymeter using a Type 225 high voltage probe.

EXAMPLE A

A bromine-containing polyester was prepared by adding 25 parts of styrene and 0.005 part of methyl hydroquinone to 75 parts of a polyester having the following composition:

| | Mols |
|---|---|
| Tetrabromophthalic anhydride | 5 |
| Adipic acid | 3 |
| Maleic anhydride | 2 |
| Ethylene glycol | 11 |

EXAMPLE 1

A polyester resin containing 10 percent by weight of bromine was prepared by adding 30 parts by weight of the polyester resin of Example A to 70 parts of a polyester resin formed by adding 35 parts of styrene, 0.005 part of methyl hydroquinone, 0.044 part of 12 percent of cobalt octoate, and 0.046 part of a 20 percent solution of copper octoate in styrene to a polyester of the following composition:

| | Mols |
|---|---|
| Adipic acid | 5.8 |
| Maleic anhydride | 1.2 |
| Diethylene glycol | 7.4 |

Two hundred parts of the above composition were catalyzed with 2 parts of methyl ethyl ketone peroxide at room temperature. The catalyzed resins were then poured into a ¼ inch cell which had been preheated to 150° F. and cured. The inside walls of the cell were coated with a mold release coating comprising 35 percent Lecithin and 65 percent styrene so that the bromine-containing film could be tested for X-ray absorption. It was found that for a 0.236 inch thick film of the bromine-containing resin at 25.1 kilovolts the fractional transmission was only 0.132. In other words, only 13.2 percent of the original X-radiation escaped through the film. At 29.7 kilovolts, the fractional transmission was 0.220 and at 37.4 kilovolts the fractional transmission was only 0.290.

EXAMPLE 2

A polyester resin containing 3.3 percent bromine was prepared by adding 10 parts by weight of the polyester resin of Example A to 90 parts by weight of a polyester resin formed by adding 35 parts of styrene, 0.005 part of methyl hydroquinone, 0.044 part of 12 percent cobalt octoate and 0.046 part of a 20 percent solution of copper octoate in styrene to a polyester of the following composition:

| | Mols |
|---|---|
| Adipic acid | 5.8 |
| Maleic anhydride | 1.2 |
| Diethylene glycol | 7.4 |

A 0.236 inch thick film of this bromine-containing resin was formed by the same method used in Example 1. It was found that at 25.1 kilovolts the fractional transmission was 0.42, at 29.7 kilovolts the fractional transmission was 0.54 and at 37.4 kilovolts the fractional transmission was 0.53.

EXAMPLE 3

A polyester resin was prepared by adding 30 parts by weight of the polyester resin of Example A, 0.15 part of 3 glycidyloxypropyl trimethoxysilane and 70 parts by weight of a polyester formed by adding 35 parts of styrene, 0.005 part of methyl hydroquinone, 0.044 part of 12 percent cobalt octoate, and 0.046 part of a 20 percent solution of copper octoate in styrene to a polyester of the following composition:

| | Mols |
|---|---|
| Adipic acid | 5.8 |
| Maleic anhydride | 1.2 |
| Diethylene glycol | 7.4 |

The resin was heated to 140° F. and poured into a ¼ inch cell which was preheated at 150° F.

The bromine-containing polyester resin containing silane had similar X-ray absorption characteristics to the resin of Example 2 and superior adhesion to glass.

EXAMPLE 4

A polyester resin formed by adding 35 parts of styrene, 0.005 part of methyl hydroquonine, 0.044 part of 12 percent cobalt octoate and 0.046 part of a 20 percent solution of copper octoate in styrene to a polyester of the following composition:

| | Mols |
|---|---|
| Adipic acid | 5.8 |
| Maleic anhydride | 1.2 |
| Diethylene glycol | 7.4 |

was externally brominated by mixing 85.4 parts of the above polyester with 14.6 parts of a brominated plasticizer comprising tris-2,3-dibromopropyl phosphate. The resultant polyester resin contained 10 percent by weight of bromine.

The resin was catalyzed with 1 part of methyl ethyl ketone peroxide and poured into a ¼ inch cell which was preheated at 150° F. The inside walls of the cell were coated with the mold release agent of Example 1.

The X-ray absorption characteristics of this resin were then tested. It was found that at 25.1 kilovolts and a thickness of 0.236 inch the fractional transmission was 0.138 and at 29.7 kilovolts the fractional transmission was 0.233 and at 37.4 kilovolts the fractional transmission was 0.267

EXAMPLE 5

A bromine-containing epoxy resin was prepared by adding 267 parts (0.718 equivalent) of an epoxy prepared from tetrabromo Bisphenol A and epichlorohydrin and 442 parts of an epoxy resin prepared from Bisphenol A and epichlorohydrin (Epon 828) (2.32 equivalent) with 2.91 parts polypropylene glycol. The resin was catalyzed with a catalyst comprising 232.5 parts of polypropylene glycol and 17.5 parts of $BF_3$ dietherate. The catalyst was added in a proportion of 5 parts per 100 parts of epoxy resin. The cured epoxy resin contained 10.6 percent bromine.

A film, 0.236 inch thick, of the above bromine-containing epoxy resin was tested for X-radiation absorption. It was found that at 25.1 kilovolts the fractional transmission was 0.096, at 29.7 kilovolts the fractional transmission was 0.170 and at 37.4 kilovolts the fractional transmission was 0.210.

EXAMPLE 6

Various laminates were prepared by pouring bromine-containing resins into cells of glass plates having no mold release coatings to test the X-radiation intensity emitted through the resin layer and glass plate. The results are shown in Table I:

TABLE I

| Safety panel | Kilovolts | $I_{rg}$ | $I_{br}$ |
|---|---|---|---|
| A | 33 | 0.686 | 0.440 |
| B | 33 | 0.686 | 0.220 |
| C | 33 | 0.686 | 0.200 |
| D | 33 | 0.686 | 0.160 |

Explanation of Table I:
A is the laminating resin of Example 2.
B is the laminating resin of Example 1.
C is the laminating resin of Example 4.
D is the laminating resin of Example 5.
$I_{rg}$ is the X-radiation intensity (milliroentgens per hour) transmitted through the glass plates and resin combination when the resin is prepared from 35 parts of styrene, .005 part of methyl hydroquinone 0.044 part of 12 percent cobalt octoate and 0.046 part of 25 percent copper octoate and 65 parts of a polyester of the following composition.

| | Mols |
|---|---|
| Adipic acid | 5.8 |
| Maleic anhydride | 1.2 |
| Diethylene glycol | 7.4 |

$I_{br}$ is the X-radiation intensity transmitted through the glass plates and resin combination with the laminating resins of Examples 1, 2, 4 and 5.

The glass plates used in the above examples had the following composition:

| | Percent |
|---|---|
| $SiO_2$ | 69.000 |
| $Na_2O$ | 16.500 |
| $K_2O$ | 0.450 |
| CaO | 7.800 |
| MgO | 2.700 |
| $Al_2O_3$ | 3.000 |
| $Fe_2O_3$ | 0.060 |
| CoO | 0.010 |
| NiO | 0.030 |

Density is 2.50

The glass plates and the resinous layers were each 0.236 inch thick.

From the above results, it is seen that the bromine-containing resin interlayer reduces the X-radiation intensity through the face plate from a value greater than the maximum permissible exposure level (0.5 mr. per hour) to safe levels.

In all the above examples, the physical and optical properties of the laminates were equivalent to those of laminates with conventional polyester and epoxy resin interlayers containing no bromine.

Although specific examples of the instant invention have been set forth hereinabove, it is not intended that the invention be limited solely thereto but to include all the variations following within the scope of the appended claims.

We claim:

1. A transparent glass laminate having reduced permeability to X-rays, said laminate comprising at least two layers of glass bonded together with an essentially clear resinous interlayer, said interlayer comprising a cured layer of bromine compound-containing resin composition selected from the group consisting of bromine compound-containing unsaturated polyester resin compositions and bromine compound-containing epoxy resin compositions.

2. The laminate of claim 1 wherein the bromine compound-containing resin composition is a bromine compound-containing unsaturated polyester resin.

3. The laminate of claim 1 wherein the bromine compound-containing resin composition comprises:

(1) the reaction product of an acid component comprising an alpha-beta-ethylenically unsaturated carboxylic acid, and a polyol, and (2) a $CH_2{=}C<$ monomer copolymerizable with the reaction product.

4. The laminate of claim 3 wherein the acid component of the unsaturated polyester contains a saturated carboxylic acid.

5. The laminate of claim 2 wherein the transparent unsaturated polyester resin comprises:

(1) the reaction product of a polycarboxylic acid and a polyol wherein about 5 mol percent to about 75 mol percent of the polycarboxylic acid component is an alpha, beta-ethylenically unsaturated polycarboxylic acid and the balance of the acid component is a saturated carboxylic acid, and (2) a $CH_2{=}C<$ monomer copolymerizable with the unsaturated reaction product.

6. The laminate of claim 2 wherein the $CH_2{=}C<$ monomer of the unsaturated polyester resin is selected from the class consisting of styrene and methyl methacrylate.

7. The laminate of claim 1 wherein the bromine compound-containing resin composition is a bromine compound-containing epoxy resin.

8. The laminate of claim 7 wherein the transparent epoxy resin is a tetrabromobisphenol-epihalohydrin epoxy.

9. The laminate of claim 1 wherein the bromine compound-containing resin composition contains from about 3 to about 40 percent by weight of bromine.

10. The laminate of claim 9 wherein the bromine compound-containing resin composition contains from about 3 percent bromine to about 10 percent bromine and at least one glass plate contains from about 1 percent lead to about 10 percent lead.

11. The laminate of claim 9 wherein the bromine compound-containing resin composition is brominated by mixing the epoxy resin or the unsaturated polyester resin with a bromine-containing compound.

12. The laminate of claim 9 wherein the bromine compound-containing resin composition is a bromine-containing unsaturated polyester resin formed by adding tetrabromophthalic acid as one of the acid components of the polyester.

13. The laminate of claim 9 wherein the bromine compound-containing resin composition is a bromine-containing unsaturated polyester resin formed by adding a brominated plasticizer to an unsaturated polyester resin composition.

14. The laminate of claim 9 wherein the bromine compound-containing resin composition is a bromine-containing epoxy resin formed by reacting tetrabromobisphenol with an epihalohydrin.

15. The laminate of claim 2 wherein the bromine compound-containing unsaturated polyester resin contains a silane selected from the class consisting of 3-glycidyloxypropylmethoxysilane, 3-(trimethoxysilyl)propyl methacrylate, and 3,4-epoxycyclohexylethyltrimethoxysilane.

16. An implosion protected cathode ray tube comprising in combination a cathode ray tube and a transparent protective member disposed over the viewing surface of said cathode ray tube said member being bonded to said viewing surface by a transparent layer, said layer comprising in polymerized form a bromine compound-containing resin composition selected from the group consisting of bromine compound-containing transparent unsaturated polyester resins and bromine compound-containing transparent epoxy resins.

17. The implosion protected cathode ray tube of claim 16 wherein the bromine compound-containing resin composition is a bromine compound-containing unsaturated polyester resin.

18. The cathode ray tube of claim 17 wherein the bromine compound-containing unsaturated polyester resin comprises:

(1) the reaction product of an alpha, beta-ethylenically unsaturated polycarboxylic acid and a polyol, and (2) a $CH_2{=}C<$ monomer polymerizable with the reaction product.

19. The cathode ray tube of claim 16 wherein the bromine compound-containing resin composition is a bromine compound-containing epoxy resin.

20. The implosion protected cathode ray tube of claim 16 where the cathode ray tube resinous interlayer and transparent cover are integral components of a color television set.

21. The cathode ray tube of claim 16 wherein the bromine compound-containing resin composition contains from about 3 weight percent to about 40 weight percent bromine.

22. The cathode ray tube of claim 21 wherein the bromine compound-containing resin composition is a bromine compound-containing resin formed by adding a brominated plasticizer to an unsaturated polyester resin composition.

23. The cathode ray tube of claim 20 wherein the bromine compound-containing resin composition contains from about 3 percent bromine to about 10 percent bromine and the transparent protective member consists of a glass plate containing from about 1 percent to about 10 percent by weight of lead.

24. The cathode ray tube of claim 20 wherein the bromine compound-containing resin composition is a bromine compound-containing unsaturated polyester resin containing a silane selected from the class consisting of 3-glycidyloxypropyltrimethoxysilane, 3-(trimethoxysilyl) propyl methacrylate, and 3,4-epoxycyclohexylethyltrimethoxysilane.

References Cited

UNITED STATES PATENTS

| | | | |
|---|---|---|---|
| 2,931,746 | 4/1960 | Robitschek et al. | 161—195 |
| 3,045,120 | 7/1962 | Ohrn | 250—108 |
| 3,053,776 | 9/1962 | Borst | 250—108X |
| 3,130,854 | 4/1964 | Casciari | 161—185X |
| 3,240,376 | 3/1966 | Smith et al. | 161—185X |
| 3,265,234 | 8/1966 | McGary et al. | 161—185X |
| 3,283,156 | 11/1966 | Mazza | 250—108 |
| 3,285,995 | 11/1966 | Nametz et al. | 260—869X |
| 3,321,099 | 5/1967 | Carlyle et al. | 161—185X |
| 3,334,008 | 8/1967 | Park et al. | 161—193 |
| 3,350,352 | 10/1967 | Smith et al. | 161—185X |
| 3,455,754 | 7/1969 | Buzzell et al. | 156—106X |

HAROLD ANSHER, Primary Examiner

U.S. Cl. X.R.

156—99; 161—193, 194, 204; 220—2.1; 250—108

PO-1050
(5/69)

UNITED STATES PATENT OFFICE
CERTIFICATE OF CORRECTION

Patent No. 3,549,478 Dated December 22, 1970

Inventor(s) Frank H. Gillery, Jacob A. Dvorak, Ronald R. Rabenold and John R. Peffer It is certified that error appears in the above-identified patent and that said Letters Patent are hereby corrected as shown below:

Column 12, line 63, that portion of the compound reading "propylmethoxysilane" should read ---propyl<u>tri</u>methoxysilane---

Signed and sealed this 26th day of October 1971.

(SEAL)
Attest:

EDWARD M.FLETCHER,JR.
Attesting Officer

ROBERT GOTTSCHALK
Acting Commissioner of Patents